United States Patent [19]

Crowe

[11] 4,145,288

[45] Mar. 20, 1979

[54] FILTER APPARATUS

[75] Inventor: William D. Crowe, San Francisco, Calif.

[73] Assignee: J. R. Schneider Company, Tiburon, Calif.

[21] Appl. No.: 913,098

[22] Filed: Jun. 6, 1978

Related U.S. Application Data

[63] Continuation of Ser. No. 779,715, Mar. 21, 1977, abandoned.

[51] Int. Cl.² .............................................. B01D 33/04
[52] U.S. Cl. .................................... 210/111; 210/127; 210/401
[58] Field of Search ................ 210/111, 116, 127, 134, 210/135, 400, 401, 386, 297; 162/348, 351; 209/307

[56] References Cited

U.S. PATENT DOCUMENTS

| | | | |
|---|---|---|---|
| 3,083,831 | 4/1963 | Fowler | 210/111 |
| 3,091,336 | 5/1963 | Hirs | 210/111 |
| 3,121,681 | 2/1964 | Baxter | 210/400 X |
| 3,506,128 | 4/1970 | Pashaian et al. | 210/387 X |
| 3,939,077 | 2/1976 | Seibert | 210/401 |
| 4,037,338 | 7/1977 | Berline | 210/401 X |

Primary Examiner—William A. Cuchlinski, Jr.

Attorney, Agent, or Firm—Owen, Wickersham & Erickson

[57] ABSTRACT

A filter apparatus wherein filter media is submerged in liquid being filtered and suction is employed under the media to increase the flow through it. The filter media in elongated strip form is supported on an incline for movement in one direction by an endless pervious conveyor. A receiving tank for dirty liquid is above the conveyor and media with a lower tank for clean liquid below the conveyor with the sides and ends of the lower tank being constantly sealed in order to maintain reduced pressure therein to enhance flow through the media. Filtered liquid is supplied at the sides of the conveyor and at an end wall of the receiving tank to prevent any migration of dirty liquid into the lower tank at the periphery of the lower tank. Advancement of the filter media is controlled automatically in response to variations in the pressure differential on opposite sides of the media which varies in proportion to the dirt load of the media. Pre-coating of the media as it enters the receiving tank is accomplished by a structure in the tank providing a transverse blinded area on the conveyor. Drying, dewatering and/or compressing of the filter cake on media emerging from the dirty liquid tank is accomplished and the conveyor and media are advanced automatically.

33 Claims, 15 Drawing Figures

FIG_1

FIG_8

FIG_9

FIG_11

FIG_12

FIG_10

FIG_15

FILTER APPARATUS

CROSS REFERENCE TO RELATED APPLICATIONS

This application is a continuation of application Ser. No. 779,715 filed Mar. 21, 1977 now abandoned.

This invention relates to filter apparatus and more particularly to improved apparatus for filtering relatively large volumes of liquid used for or in conjunction with various industrial processes.

BACKGROUND OF THE INVENTION

Filters of the type wherein air suction is utilized to force liquid being filtered through a sheet-like filter media have been known and used in the filter art. In these prior art filters as shown, for example, in U.S. Pat. Nos. 3,087,620, 3,347,378, 3,358,834, 3,506,128 and 3,690,466, an elongated sheet of filter media, such as a thick filter paper, was supported on a chain linked conveyor located with a tank. To enhance the flow of liquid through the media some means for producing a vacuum below the media was provided. One serious problem which arose with such filters was in providing adequate air sealing along the sides and ends of the media. Without proper sealing the power required for producing an adequate suction or vacuum in the collection tank under the conveyor became excessive, or the flow produced through the filter media was inadequate due to air leakage. The sealing problem was further aggravated when is became necessary to advance the filter media as it became loaded or clogged with filtrate. The problem of maintaining an adequate vacuum in the collection tank was also related to the problem of providing a conveyor support for the media that was movable, yet perforated to the degree necessary to allow the suction force to take effect and cause liquid to flow through the media.

Other problems with such filter apparatus arose in providing an efficient means for introducing fresh filter media as the media being used became clogged and also for precoating the fresh media. In addition, it was found necessary or highly desirable to provide some means for removing excessive air from the fluid being filtered and also of removing liquid from and/or drying relatively thick filter cakes or filtrate accumulations. Further, it was desired to provide a filter apparatus that would operate at least semi-automatically without the necessity for being closely monitored.

Accordingly, a general object of the present invention is to provide an improved filter apparatus that solves the aforesaid problems.

Another more specific object of the invention is to provide a filter apparatus of the vacuum type wherein an elongated sheet of filter media forms the bottom of a receiving tank and is immersed in the liquid being filtered and is effectively sealed along both sides and the ends of the tank so that a vacuum produced in a chamber below the tank will cause a relatively high flow rate through the media.

Another object of the present invention is to provide a filter apparatus wherein an elongated filter media is supported on an inclined, continuous belt that not only provides the necessary support with flexibility but also has a high porosity to facilitate adequate flow as well as strength and durability.

Another object of the present invention is to provide a filter apparatus wherein an elongated filter media is supported on a continuous belt that is advanced automatically at a speed that varies in response to variations in the pressure differential above and below the filter media, which variations are directly related to variations in the dirt load on the media.

Another object of the present invention is to provide a filter apparatus with an endless conveyor that is automatically controlled to advance the media under full and operating differential pressure and which permits modulation of media speed in response to variations in dirt load as signified by the differential pressure.

Another object of the present invention is to provide a filter apparatus wherein an elongated filter media forming the bottom of a receiving tank for dirty fluid is supported on a perforated continuous belt that is inclined upwardly from a media inlet end of the tank to a media exit end which enables the sheet media to utilize additional cake forming filter media.

Another object of the present invention is to provide a filter apparatus of the type wherein an elongated strip of filter media is supported on and moved by a continuous belt means and wherein precoating of the media is accomplished automatically on the moving media before it is moved into its full filtering position.

Another object of the present invention is to provide a filter apparatus of the type wherein an elongated strip of filter media is supported on and moved by a continuous belt means which also provides a means for drying, dewatering and/or compressing the filter cake or the filter media at the front end of the filter.

Still another object of the present invention is to provide a filter apparatus of the type wherein an elongated strip of filter media is supported on and moved by a continuous belt means that is particularly easy to operate and maintain and that is particularly well adapted for ease and economy of manufacture.

SUMMARY OF THE INVENTION

A filter apparatus according to the present invention comprises generally a tank with sidewalls for receiving liquid to be filtered such as coolant for metal working machinery which must be cleansed before being recycled to the machinery. Forming an inclined bottom of this tank is one elongated portion of a continuous belt that is supported and sealed along its edges. At one end of the tank the belt is passed around a system of rollers that operate to feed filter media from a supply roll into the tank. At the other end the belt extends around additional rollers that function to dispense the used filter media into a suitable receptacle. The continuous conveyor belt is perforated and yet strong enough to support the filter media in addition to a buildup of collected solids. Below that portion of the belt which forms the inclined bottom portion of the receiving tank is a collection chamber for filtered liquid having an outlet connected to a suction or vacuum producing pump. The front and back transverse ends of the collection tank are provided with sealing cross members that prevent air flow into the tank. Similarly, the sides of the collection tank having air sealing members and cavities above these sealing members are provided for receiving a feed back supply of clean liquid that maintains side and inlet-end sealing of the collection chamber so that the suction applied at its outlet produces a vacuum within the chamber and causes increased flow of filtered liquid through the media. Precoating of the filter media is accomplished by the arrangement of cross members at the rear or deep end of the dual tank structure, and drying or dewatering of the used filter media is accomplished along an inclined end portion which extends from the upper end of the receiving tank. The filter media is advanced automatically through the receiving tank by a drive roller connected to a controller motor. Sealing around the periphery of the collection tank below the conveyor belt is constantly maintained even when the belt and media are moving. The speed of advancement of the belt and filter media is controlled by the variations in the pressure of fluid flowing from the collector chamber. Thus, the speed of filter media advancement is increased in response to media clogging which increases the vacuum in the collection chamber and retards the flow rate of clean fluid from it.

Other objects, advantages and features of the invention will become apparent from the following detailed description taken with the accompanying drawing.

DETAILED DESCRIPTION OF PREFERRED EMBODIMENT

Figure 1:
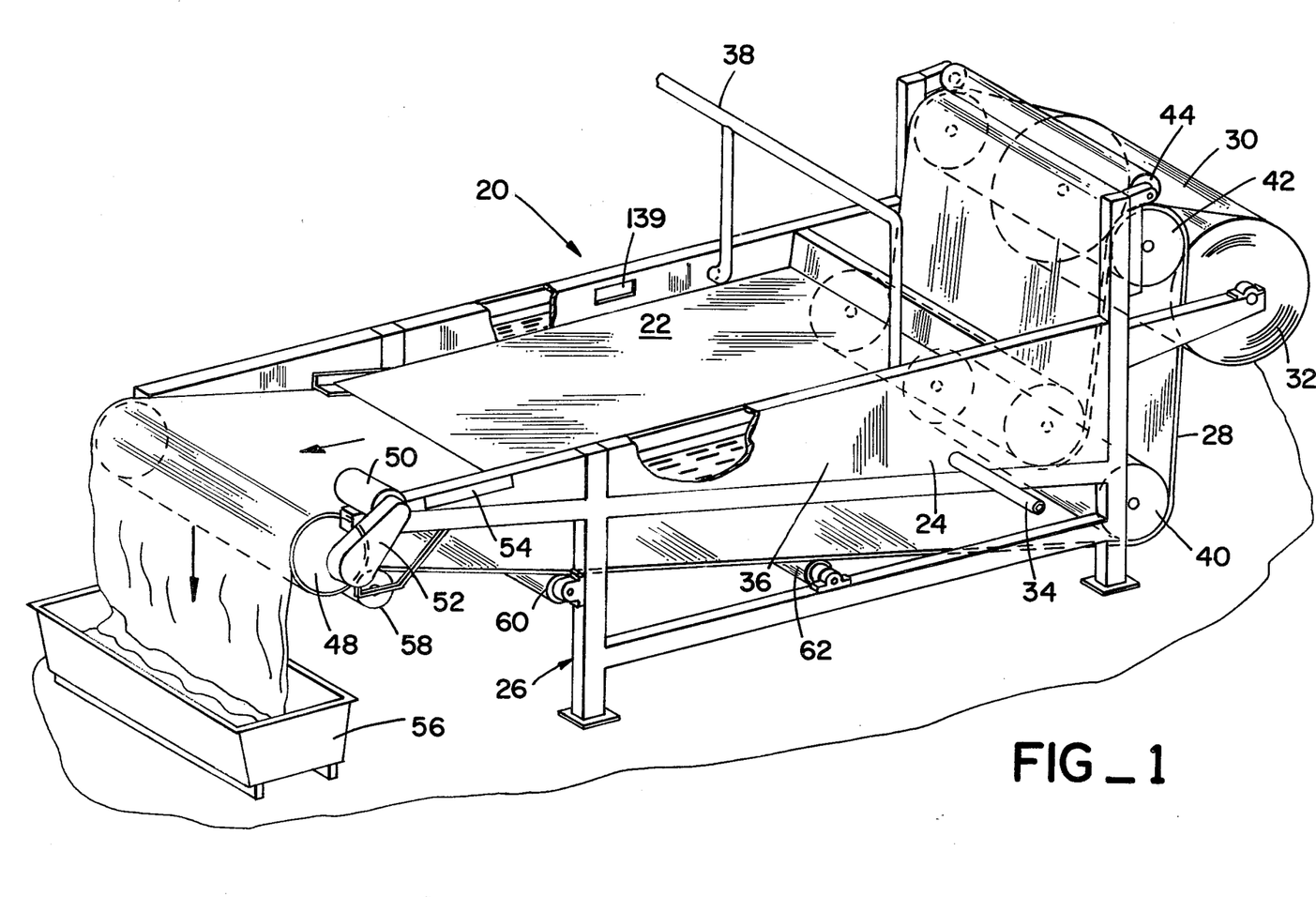
FIG. 1 is a view in perspective showing a filter apparatus embodying the principles of the present invention.

Referring to the drawing, FIG. 1 shows a filter apparatus 20 embodying the principles of the present invention. Generally it comprises a receiving tank 22 for dirty liquid to be filtered, located above a collection tank 24 for clean, filtered liquid, both tanks being supported by a suitable frame 26. Separating these two tanks and forming the bottom of the receiving tank is an inclined perforated belt 28 which supports a layer or strip of filter media 30 fed from a supply roll 32 mounted on the frame. The collection tank under the belt has an outlet conduit 34 connected to a suction pump (not shown in FIG. 1), and its periphery is sealed from the receiving tank. This enables reduced pressure to be maintained in the collection tank which induces greater flow through the filter media and the supporting pervious belt. The aforesaid sealing is accomplished in part by the use of narrow compartments 36 formed along the outer, opposite sides of the receiving tank which receive a feedback supply of clean liquid through a conduit 38. The entire sealing arrangement for the collection tank relative to the movable belt and the receiving tank will be described in detail later on.

The belt is continuous and extends around a series of supporting rollers at opposite ends of the tanks. At one end of the apparatus it engages a lowermost roller 40, then extends substantially vertically and around an uppermost roller 42, at which point the filter media is applied to the belt and held thereto by a pivotal tension roller 44. Rearwardly from the receiving tank 22 the belt 30 and layer of filter media extends downwardly from roller 42 and partially around a back roller 46. From this roller the belt slopes upwardly, and at the front end of the apparatus it extends partially around a head roller 48 connected by suitable mechanical gearing mechanism, designated by numeral 50 to a drive motor 52. At the forward end of the apparatus is a drying chamber 54 for removing excess moisture from the filter media before it moves over the head roller and into a suitable receptacle 56. Near the front drive roller 48 is a snubber roller 58 that is pivoted against the belt by a spring force to hold it against the drive roller and thereby provide a high degree of driving surface contact between the roller 48 and the belt. The lower return portion of the belt is supported on a pair of idler rollers 60 and 62, both of which are mounted on the apparatus frame. The apparatus is provided with a control system (not shown in FIG. 1, but described in detail later on with reference to FIG. 15) which automatically controls the motor 50 so as to modulate the advancement of the belt and filter media in response to variations in the differential pressure in the receiving tank and collection tank.

Figures 2, 3:
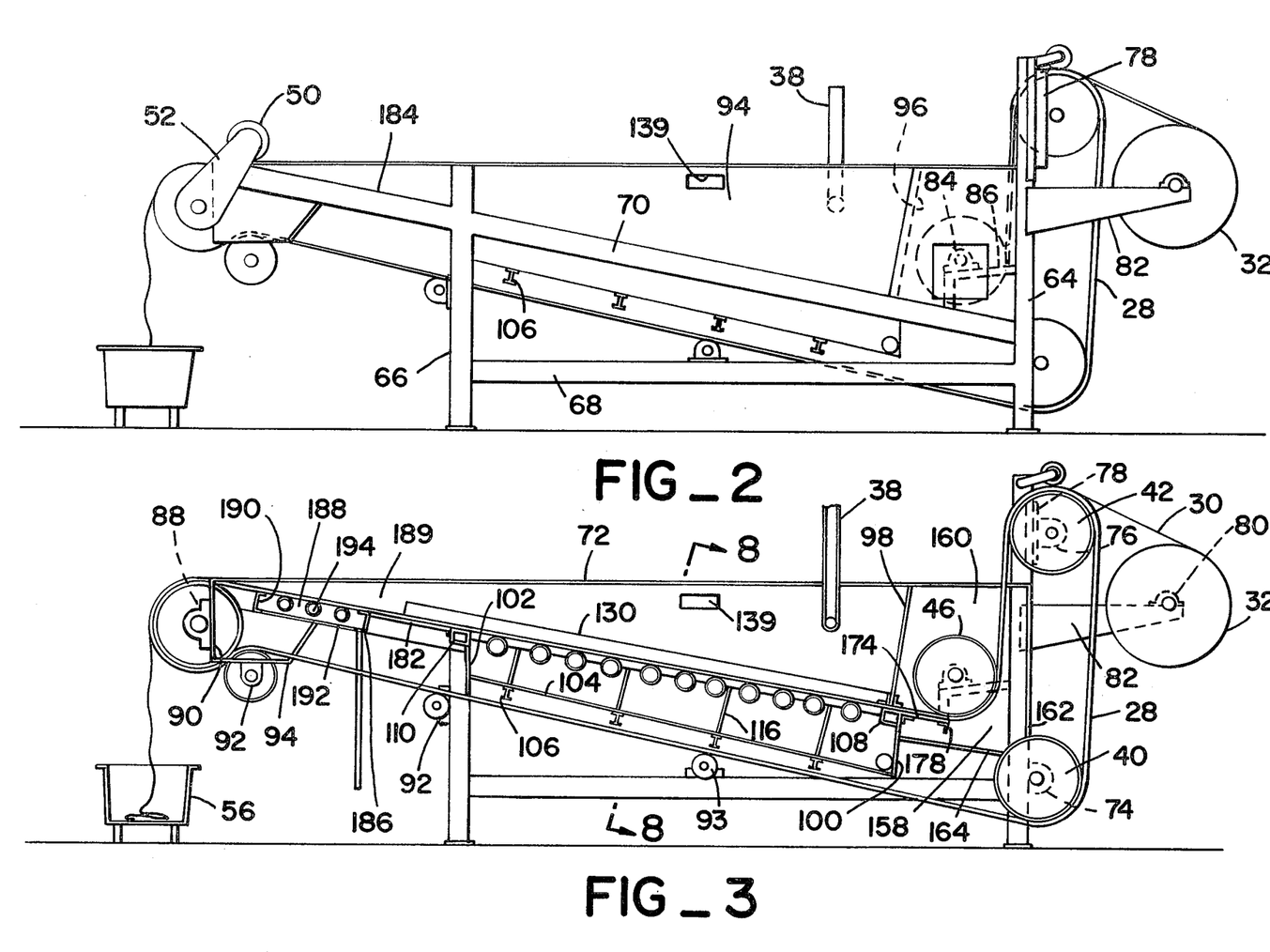
FIG. 2 is a view in side elevation of the filter apparatus of FIG. 1.
FIG. 3 is a view in side elevation and partially in section of the filter apparatus of FIG. 1.
Figure 4:
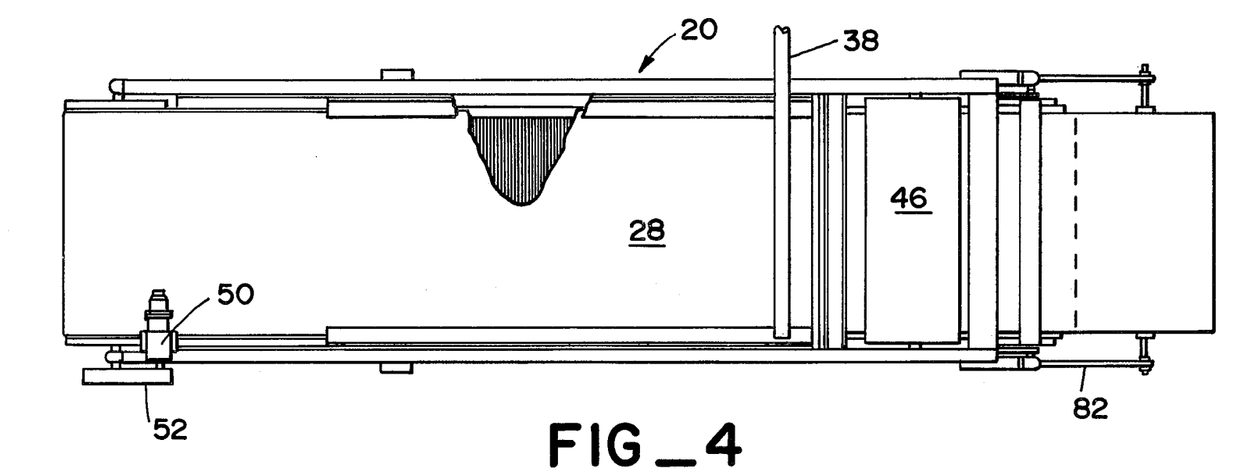
FIG. 4 is a top view of the filter apparatus with portions broken away.

Turning now to FIGS. 2-4, the apparatus 20 will be described in greater detail. The frame 26 is comprised of a pair of spaced apart rear upright members 64 and similar but shorter forward upright members 66, all of which may be formed from rigid structural metal members such as elongated channel shaped stock. Interconnecting and extending between these front and rear upright members are a pair of lower horizontal members 68. Above them are a pair of inclined members 70 that are fixed to the upright members and extend forwardly from the front upright members 66.

Upper horizontal frame members 72 are fixed to the vertical members and to the inclined members 70 at their forward end.

All of the belt supporting rollers have end shafts that are journaled in bearings fixed to various frame members. Thus, rollers 40 and 42 are supported by bearings 74 and 76 respectively attached to the upright frame members 64. The upper bearings 76 are mounted on adjustable base members 78 so that roller 42 can be moved relative to roller 40 to vary belt tension. The filter media supply roll 32 is supported by bearings 80 fixed to a pair of arms 82 that are cantilevered rearwardly from the frame members 64. The back roller 46 is journaled in bearings 84 fixed to an auxiliary frame member 86 extending between and fixed to frame members 64 and 70. The front drive roller 48 is supported by bearings 88 which are fixed to a front vertical plate 90 attached to the ends of the inclined frame members 70. The snubber roller 58 is supported by bearings 92 fixed to another mounting plate 94 attached to the front plate 90 and to the frame members 70. The idler rollers 60 and 62 are supported by bearings 92 and 93 fixed to the frame members 66 and 68, respectively.

The receiving tank 22 fits inside of the frame 26 and is comprised of a pair of appropriately shaped pieces of sheet metal forming side walls 94, each of which extends from an intermediate frame member 96 between horizontal and inclined frame members 72 and 70 forwardly to the front vertical frame member 66. These side walls also extend downwardly from the frame member 72 at the top edge of the receiving tank to the bottom edge of the collecting tank. (See FIG. 8). A transverse rear wall member 98 spaced forward from the back roller 46 extends between and forms sealed corner joints with the side walls 94.

The collection tank 24 for clean liquid is formed by the lower portions of the sheet metal side walls 94, a rear end wall 100, a forward end wall 102 and a bottom wall 104, all of which are also made from sheet metal material. The bottom wall is preferably stiffened and strengthened by a series of spaced apart, transverse I-beam members 106 fixed to its underside.

Extending between the side walls 94 at their rear ends and between the receiving tank and the collection tank is a transverse rear seal member 108. A similar transverse front seal member 110 is fixed to the side walls 94 at their forward ends. Both of these seal members are hollow but rigid structural members with a rectangular cross-section that provides an upper flat surface essentially parallel with the slope of the inclined frame members 70.

Figure 8:
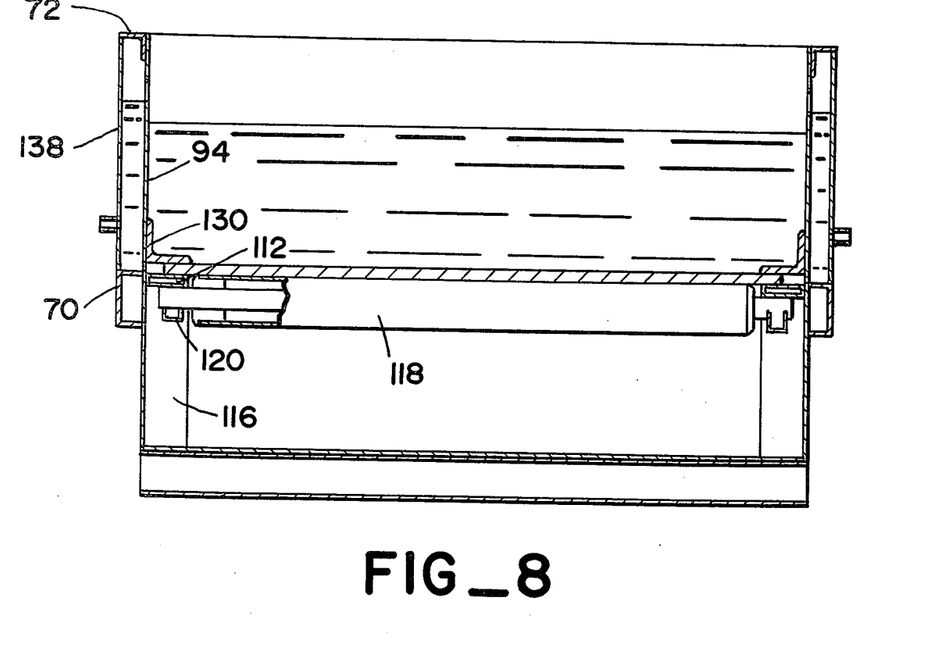
FIG. 8 is a view in section taken along line 8—8 of FIG. 3.
Figure 9:
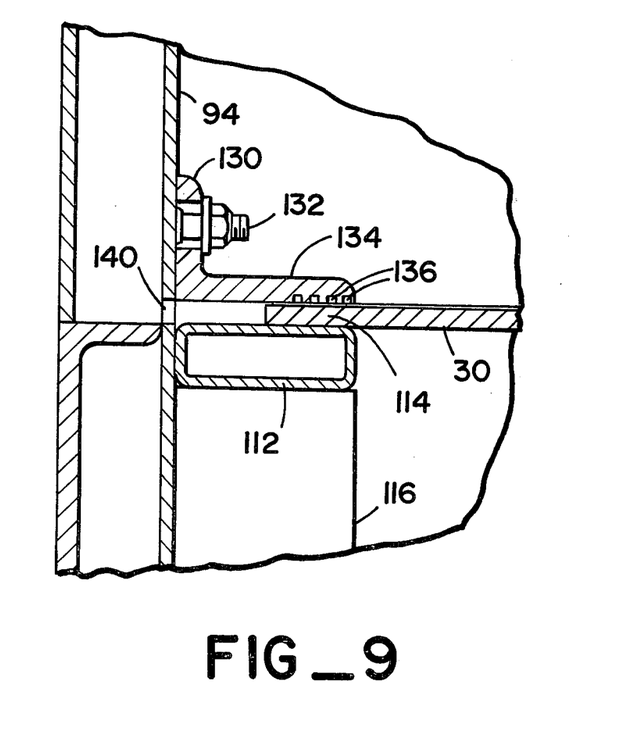
FIG. 9 is an enlarged view in section showing the side sealing elements for the belt.

Fixed to the inside surface of each side wall 74 is a rigid inclined member 112 forming a belt side support. As shown in FIGS. 8 and 9, these belt support members may have a rectangular, tubular cross section with a flat upper surface that is engaged by one side portion 114 of the belt 30. Spaced apart at intervals below each belt support member 94 are a series of vertical strengthening members 116, comprised of short metal pieces that are also fixed to a lower portion of each side wall 94 and to the bottom 104 of the collection chamber or tank 24.

Support for the entire span of that portion of the inclined belt 30 which forms the bottom of the receiving tank 22 is afforded by a series of spaced apart idler rollers 118 located under the belt and extending perpendicular to its direction of travel. The end shafts of these rollers are supported by bearings 120 fixed to the inclined belt support members 112 between the vertical pieces 116.

Figure 5:
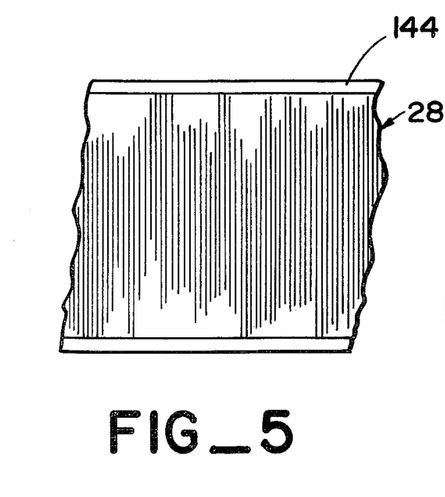
FIG. 5 is a fragmentary top view of the conveyor belt for a filter apparatus according to the invention.
Figure 6:
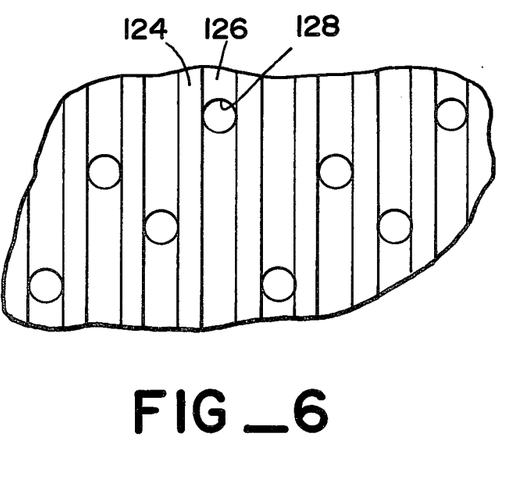
FIG. 6 is an enlarged fragmentary view of the conveyor belt.
Figure 7:
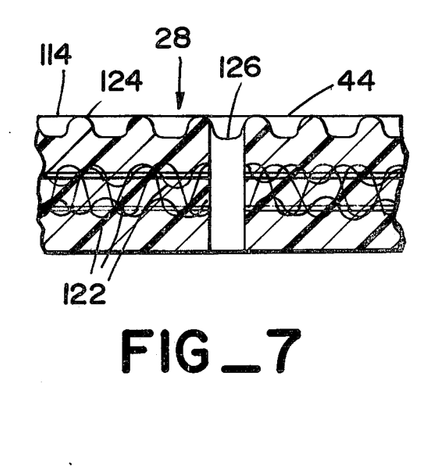
FIG. 7 is an enlarged fragmentary view in section of the belt.

As shown in FIGS. 5-7, the belt 28 is preferably formed from a durable but flexible material which may be a plastic such as polyurethane or natural rubber, preferably with imbedded fabric particles 122 to provide added strength. The upper or outer surface of the belt is formed with alternating transverse ridges 124 and grooves 126 of uniform depth (e.g. 0.5–0.12 inches) and width (e.g. 0.20–0.25 inches). Provided within these grooves are spaced apart holes 128 having substantially the same width. Along each of the opposite sides of the conveyor belt is the smooth side portion 114 of uniform width (e.g. 1.0 inch) whose surface is essentially flush with the transverse ridges 124. These side portions which ride along the inclined side supports 112 help in providing a continuous seal along the sides of the belt, as will be described later.

As previously stated, the outlet 34 of the collection tank 24 is connected to a suction pump which creates and maintains a reduced pressure within the collection tank to enhance flow of liquid through the filter media and its supporting inclined porous belt 28. In order to maintain the reduced pressure within the collection tank, adequate sealing along its side and edges must be provided. This is accomplished in part by provision of a pair of right angle side sealing members 130. The vertical leg of each of these seal members is secured by fasteners 132 to the inside surface of a side wall member, and its horizontal leg 134 is spaced above and parallel to the flat surface of a belt side portion 114 and to the upper surface of a belt support member 112. A series of grooves 136 provided in the lower surface of the horizontal leg form a labyrinth on each side sealing member.

As shown in FIG. 8, on each side of the receiving tank 22 a side plate 138 is attached to the inclined frame member 70 and extends upwardly to connect with a right angle horizontal frame member 72 along the upper edge of the side wall member 94. Thus, the pair of narrow side tanks or compartments 36 on the opposite sides of the receiving tank are formed, to which is supplied a continuous stream of clean or filtered liquid. This clean liquid is maintained within the side tanks or compartments 36 at a level that is higher than the liquid level in the receiving tank 22, so that the clean liquid pressure at the bottom of these side tanks is greater than the pressure of dirty liquid at the edges 114 of the belt 28. A pair of overflow openings 139 are provided near the top of the side walls 94 which maintain the liquid level in the side compartments at their maximum level. Openings 139 are provided at intervals in the side walls 94 to provide communication with the space between the side sealing members 130 and the belt support members 112. Thus, because of its greater pressure, clean liquid from the side compartments 36 constantly tends to flow into the receiving tank past the labyrinth of grooves 136 on the side sealing members. This effectively prevents any dirty liquid or deleterious matter from the filter media within the receiving tank from migrating to its outer edges and under the edges of the belt side portions into the collecting tank for clean liquid.

The side sealing members 130 extend well forward of the front seal member 110 and above the maximum level of the dirty fluid in the receiving tank, and therefore the flow of clean liquid from the side compartments 36 is effective to provide sealing and prevent any dirty liquid migration all along substantially the entire inclined portion of the belt.

Figures 10, 11, 12:
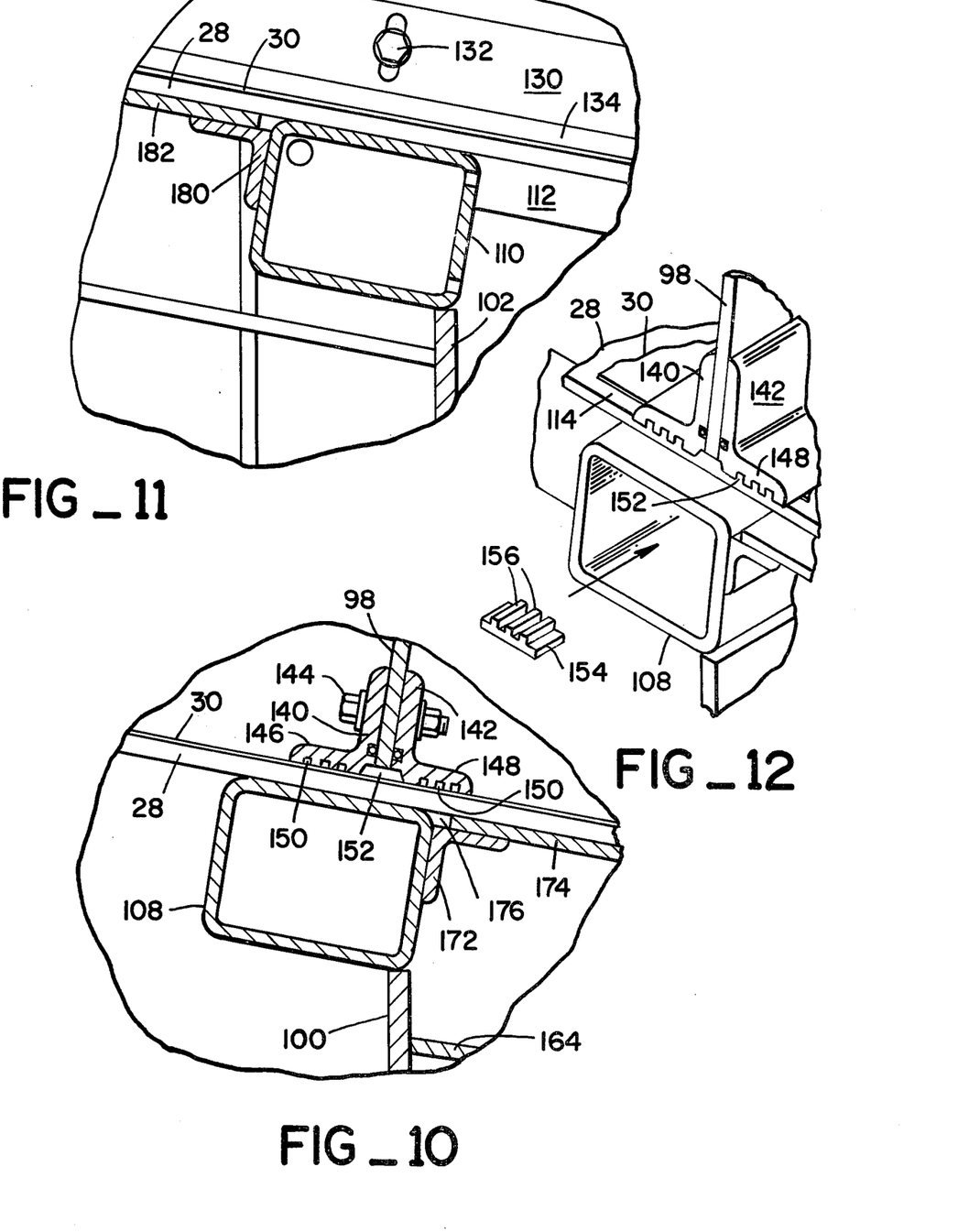
FIG. 10 is an enlarged view in section showing the rear cross seal member.
FIG. 11 is an enlarged view in section showing the forward cross seal members.
FIG. 12 is a fragmentary view in perspective showing a sealing plug for the rear seal member.

As shown in FIG. 10, sealing of the receiving tank 22 along the bottom edge of the rear wall 98 is accomplished by a pair of right angle sealing members 140 and 142 that are similar in structure and function to the side sealing members. Here, the upright leg portions of these two sealing members are fixed to the lower edge of the rear wall 98, as by machine bolts 144, so that their horizontal leg portions 146 and 148 respectively, each with bottom surface grooves 150, are spaced just above the rear cross seal member 108 so as to be in contact with the filter media 30 which passes under it.

At the junction of the two rear seal members 140 and 142 and the lower edge of the rear wall, a recess 152 is formed above the filter media which extends transversely under the rear wall. This recess is fed with clean fluid from the side tanks 36 so that migration of dirty fluid from the receiving tank under the seal member is prevented.

At each end of the rear right angle sealing member 142 a short side plug member 154 is provided for blocking the ends of the grooves 150 in its horizontal leg portion 148. This plug member has matching ridges 156 which are sized and spaced apart to fit snugly in the grooves 150 of the sealing member 142 and is compressed against the sidewall 94 of the overflow tank to bear against the edge of the movable belt. Thus, clean liquid is prevented by these plugs from moving rearwardly of the rear seal member along the sides of the belt. Some of the clean liquid that flows into the transverse recess 152, as previously described, migrates under the leg 148 of the rear seal member 142 and into an overflow compartment 158, on the back side of the receiving tank.

The construction and location of the rear cross seal member 108 as described, provides for an advantageous "precoating" of the fresh filter media just as it becomes exposed to the dirty unfiltered liquid in the receiving tank. This media "precoating" occurs because as the filter media supported on the conveyor belt 28 passes under the rear wall of the receiving chamber and the grooved sealing member 140, direct flow through the filter media is initially prevented by the cross seal member 108. Thus, for a substantial period of time as the media emerges from under the grooved sealing member 140 it is blanked off underneath the belt 28 by the cross seal member 108. This makes it necessary for liquid to flow laterally through the media for a finite period when the dirty liquid initially contacts the media instead of directly through it at essentially a 90° path. The effect of this initial lateral flow in the media causes a "precoating" of the media fibers internally that prevents "channeling" and enhances the media's subsequent filtering capability as it moves further along through the receiving tank.

The overflow compartment 158 which is rearward of the receiving tank end wall 98, is formed by side wall members 150 fixed to the frame members 64 and 94, an end wall 162 and a bottom member 164, also fixed to the frame. Within the overflow compartment which catches the clean liquid that manages to work its way under the rear sealing member, is a float 166 (shown diagrammatically in FIG. 15) which operates a valve 168 in a drain line 170 connected from the overflow tank to the main outlet conduit 34 from the clean liquid tank 24.

A right angle member 172 is fixed by one of its legs to a rear side surface of the rear cross seal member 108, and fixed to this right angle member is a belt support plate 174 that extends into the overflow compartment 160 adjacent to the receiving tank. The forward edge of this support plate is spaced from the rear top edge of the cross seal member 108 so as to form a narrow transverse seal chamber 176. This chamber normally fills with clean liquid that seeps from the side tanks 36 and serves to lubricate the underside of the belt 28 as it moves over the transverse seal member 108. The rear edge of the support plate is cantilevered into the rear compartment and is stiffened by a right angle member 178 fixed thereto. This reinforced rear edge is located approximately at the point where the belt is tangential to the roller 46 (FIG. 3).

At the front end of the filter is an extended shallow portion of the receiving tank 22 for dirty liquid that extends forwardly of the front cross seal member 110. Fixed to the front side of this cross member, by a vertical leg portion (as shown in FIG. 11) is a right angle member 180 whose horizontal leg portion supports the rear end of a front seal apron 182 that forms the bottom support for the belt 28. This apron slopes upwardly at the same angle as the sloping frame members 70 and its side edges are welded to them. A pair of triangular shaped vertical side members 184 are welded to the upper horizontal and sloped frame members to form the sidewalls of the shallow portion of the receiving tank (FIG. 2). The forward edge of the apron 182 is attached to a transverse channel member 186 which forms the rear end wall of a drying chamber 188 (FIG. 3). The ends of the channel member are fixed to the sloping frame members 70, and a similar channel member 190 is spaced forwardly from the rear channel member 186 to form the front wall of the drying chamber. A flat sheet 192 connected to these two channel members and to the side frame members 184 forms the bottom of the drying chamber. The belt moving across the top of the drying chamber is supported by a series of rollers 194 that are spaced apart in the chamber 188 with their ends supported in bearings fixed to the inclined frame members 70. An outlet 196 is provided from the drying chamber which is connectable to a vacuum source or suction pump 198 so that air can be circulated through the chamber and hence through the belt and filter media to dry the latter before it moves over the outer roller and into a suitable waste receptacle 56.

Figure 13:
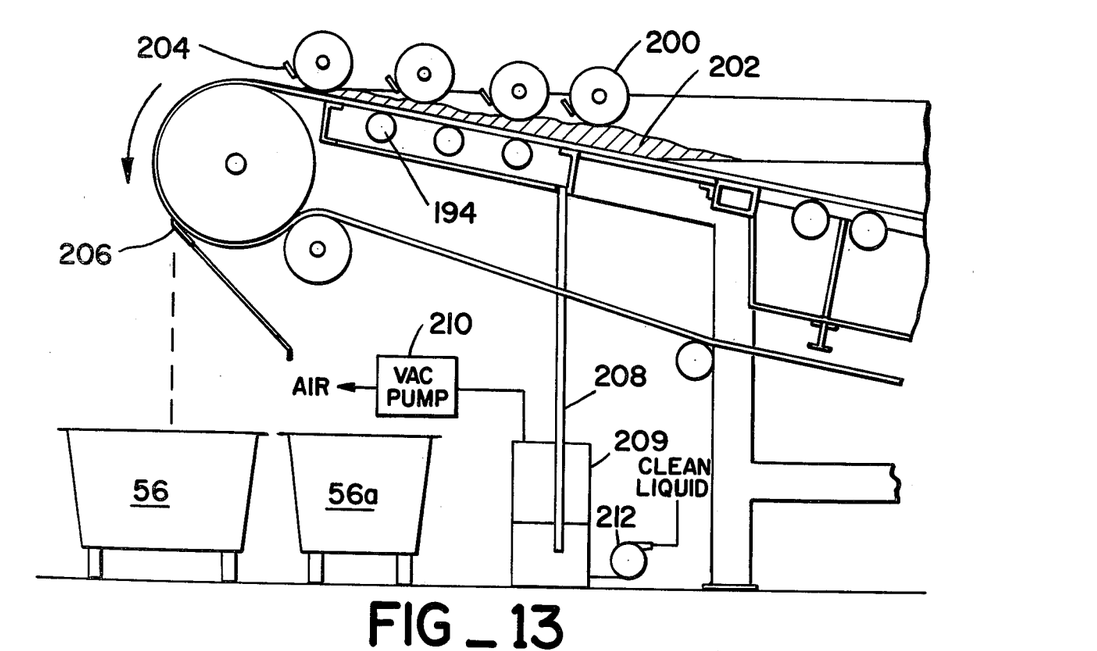
FIG. 13 is a fragmentary view in side elevation of the filter apparatus having one form of a cake compression device.

In some instances, it may be desirable to extract water or some other liquid from the accumulated filter media or cake and/or deposited filtrate thereon by squeezing it against the belt. Alternate arrangements for accomplishing this liquid extraction are shown diagrammatically in FIGS. 13 and 14. In the arrangement of FIG. 13, a series of spaced apart dewatering compression rollers 200 are provided transversely above the belt at the forward end of the filter. These freely rotatable rollers are supported at their ends by suitable bearing members (not shown) and they are positioned so that the distance between the outer surface of each roller and the belt decreases for each roller that is nearer to the forward end of the fitler. Thus, the most forwardly compression roller which is somewhat rearwardly of the forward belt drive roller is spaced closest to the belt surface. Therefore, as the belt emerges from the receiving tank, the accumulated media or cake 202 and filtrate on it is progressively squeezed and compacted as it rolls under the compression rollers. A scraper blade 204 is provided on each compression roller 200 to remove any media from it that might tend to stick to it as the roller turns. As the filter media moves around the drive roller 48, another scrapper blade 206 may be utilized to remove the compressed and dewatered cake from the media strip, so that it can be collected in a separate receptacle. The spent media may be deflected and collected in a second receptacle 56a. The clean liquid that is pressed from the filter cake by the compression rollers may be directed by a drain line 208 into an enclosed container 209 whose upper end is connected to a vacuum pump 210 to remove air and to a liquid return pump 212 at an outlet located at the bottom end of the container. The outlet of the return pump may be directed to either the receiving tank or to one of the side tanks for clean fluid.

Figure 14:
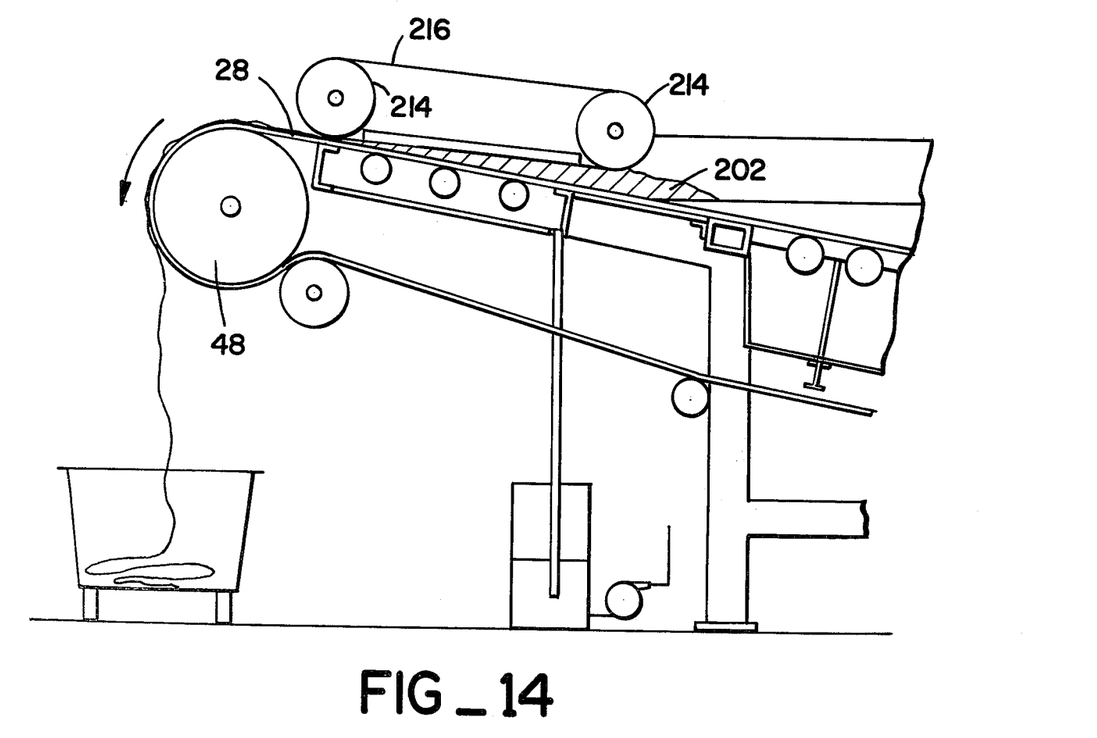
FIG. 14 is a fragmentary view in side elevation similar to FIG. 13 showing a filter apparatus according to the invention with an alternate form of cake compression device.

In the alternate dewatering arrangement shown diagrammatically in FIG. 14, a pair of spaced apart rollers 214 are utilized to support an auxiliary belt 216 that is positioned to converge with the main belt 28 near the forward drive roller 48. The convergence of this auxiliary belt functions to gradually compress and compact the filter cake 202 against the main belt just as it turns around the drive roller. Here, the compressed cake and media is shown being collected together in one receptacle, and the clean liquid removed from the filter cake is again collected in the chamber 188 and thence in a deaerating container 209, before being pumped to either the tank of clean fluid or to the receiving tank.

Figure 15:
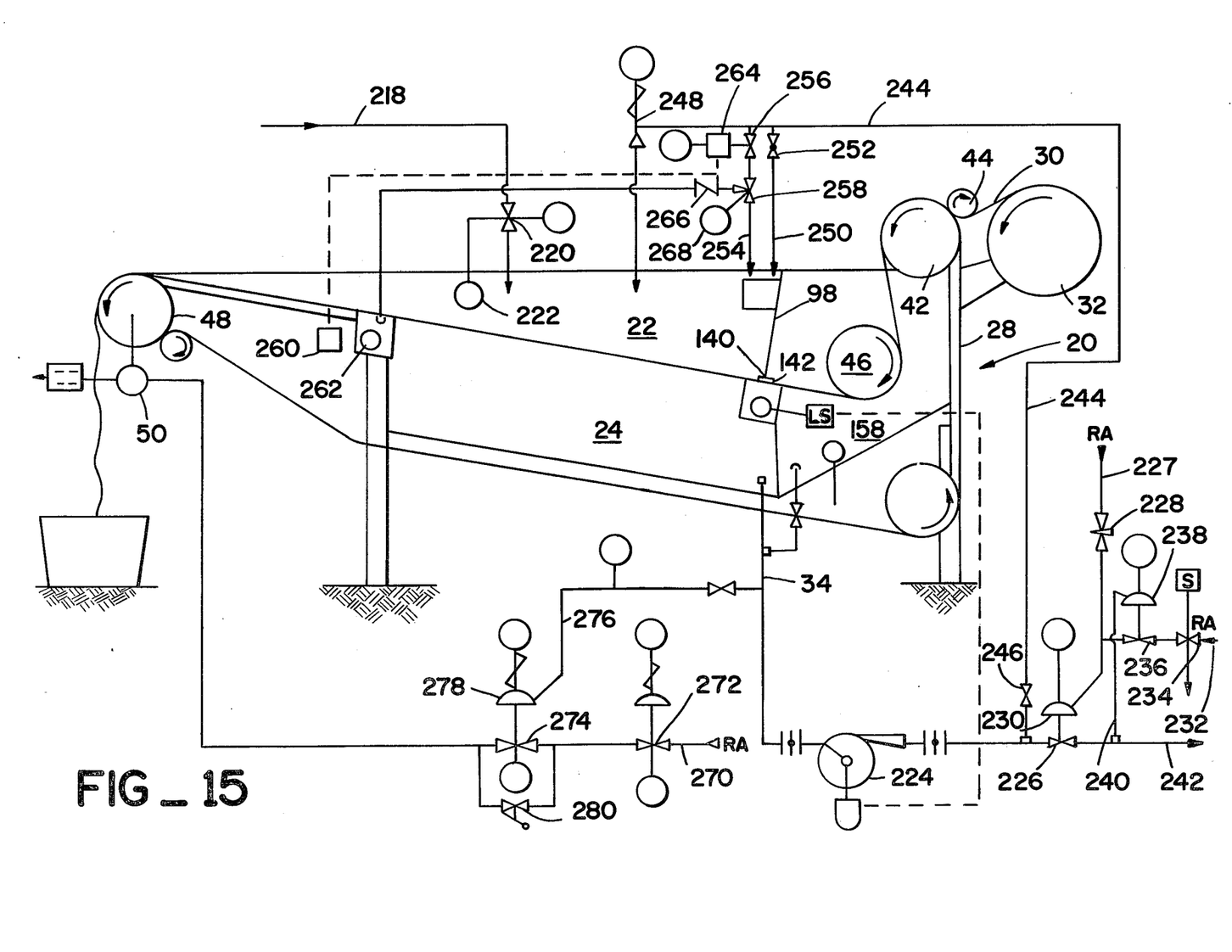
FIG. 15 is a schematic diagram of a filter apparatus according to the present invention showing its principle operating components.

The control system for the filter 20 and its operation in a typical industrial installation may be best understood by reference to the schematic diagram of FIG. 15. Filter media 30 from the fresh roll supply 32 is first threaded over the belt 28 on the takeup roller 42 and under the tension roll 44 and down into the rear overflow tank 158. Within this tank it extends around the rear belt roller 46 and then under the rear wall 98 and its seal members 140 and 142 and into the main receiving tank 22. As the filter strip leaves the receiving tank it passes over the drying chamber 188 and around the forward or head pulley 48 which is driven by the motor 50. Direct manual override operation of the air motor is used to move the belt to facilitate initial threading.

Dirty fluid collected from a typical process apparatus is furnished through a fluid inlet line 218, an inlet level control valve 220 and into the receiving tank 22. A float 222 within the receiving tank is connected to the valve 220 so that it will shut off automatically when the tank is full. Initial filling of the receiving tank is accomplished with the vacuum pump off.

The outlet from the clean fluid tank under the belt is connected through the fluid outlet conduit 34 to the inlet of a main vacuum pump 224. An outlet conduit from this pump is connected through a pressure control valve 226 to a suitable storage tank (not shown) for clear filtrate.

This pressure control valve 226 is controlled by regulated compressed air (RA) derived from a suitable plant air source through a first line 227 directly through a manually controlled needle valve 228 to the diaphragm 250 of the pressure control valve 226.

Another regulated air line 232 for the control valve 226 is connected first through a solenoid valve 234 and thence through a pressure control pilot valve 236 whose diaphragm 238 is controlled by a downstream pressure tap 240 to the outlet conduit 242. Thus, if the flow of clean fluid in the outlet conduit is reduced to a point where pressure to the diaphragm 238 of the pilot valve 236 falls below a preselected level, the valve will close and prevent regulated air pressure from reaching the diaphragm 230 of the control valve 226. Unless the needle valve 228 is opened manually, the valve 226 will close so that clean fluid will be recycled in a return conduit 124 to the receiving tank 22.

This return or feed back line 244 for clean fluid is the outlet line 242 from the pump 224 and passes through a manual valve 246 and thence to a pressure relief valve 248 whose outlet is furnished to the main receiving tank 22. A first branch line 250 from the fluid line 244 passes through a manually controllable globe valve 252 and furnishes clean fluid to the sealing tanks 36. A second branch line 254 from the fluid line 244 is connected through a solenoid controlled level valve 256 to an eductor valve 258 whose outlet is also furnished to the clean fluid sealing tank. A level switch 260 for the valve 256 is connected to a float 262 provided in the air stripping chamber 188 at the front end of the filter. When excessive stripped air is present in the stripping chamber, the float 262 will actuate the level switch 260 which in turn operates another switch 264 on a level valve pilot controlling the eductor. The eductor then operates to suck air from the front stripping chamber 188 through a check valve 266 and expels it through an exhaust port 268 of the eductor. when the level switch closes, the eductor continues to allow clean fluid to flow automatically into the side sealing chambers.

Another tap of regulated compressed air (RA) is supplied to an air line 270 through a first pressure regulator valve 272, a speed regulator valve 274 and thence to the air motor 50 for advancing the conveyor belt 28. As previously described, the air motor is connected through a suitable drive system to the front end roller 48 of the apparatus. The pressure regulator valve 272 operates to maintain the air pressure at a uniform desired operating level. The speed control valve 274 is controlled by fluid pressure in a line tap 276 from the fluid outlet conduit 34 which is connected to a diaphragm 278 for the speed control valve. When the outlet line pressure decreases to a preselected level due to clogging of the filter media on the belt and consequently causing a reduction of pressure in the lower chamber 24, the diaphragm 278 operates to open the valve 274 and thereby furnish regulated air to the air motor so that the dirty filter media will be advanced by the belt. A manually controllable bypass valve 280 is provided around the automatic speed control valve in order to operate the air motor when it is desired to advance the media, as when installing or threading it through the apparatus.

From the foregoing description, it should be apparent that the present invention provides a movable belt type filter apparatus with improved efficiency and versatility. Using the side tanks of clean liquid and the labrinyth sealing members it solves the problem of peripherally sealing the lower chamber or tank for clean liquid below the moving belt and filter media that comprises the pervious bottom of a receiving tank for dirty liquid. Arranging the belt at an inclined position provides several advantages such as facilitating the use of a variety of cake type or paper media. The belt itself, though pervious and flexible, is exceptionally strong and durable. The control system for the apparatus provides a reliable means for modulating the advancement of the belt and filter media in response to an increase in the pressure differential between the dirty and clean tanks which is also a measure of the buildup of accumulated solids on the media. The apparatus may be useful in a wide range of industrial applications and will operate continuously without manual control or monitoring.

Although the filter apparatus 20 has been shown in an arrangement where the elongated paper type filter media 30 is applied to the conveyor belt 28 from the supply roll 32, the apparatus may also be useable and highly effective in some applications where the endless belt itself provides the filtering media, and no additional media is used. In such an arrangement the spaced apart holes 128 on the belt 28 may be made smaller in size and closer together depending on the form of liquid and material to be filtered. Instead of recovering used filter media in receptacle 56 as previously described, the filter-belt would merely be washed off as it moved over the forward drive roller 48. The movement of the filter-belt in this instance may be controlled in the same manner as when a separate media is used.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A filter apparatus comprising:
    a frame;
    a continuous flexible and pervious conveyor belt;
    rotatable means on said frame for supporting said belt so that an inclined upper portion thereof slopes upwardly between two of said rotatable means;
    means attached to said frame forming a receiving tank for dirty liquid above said inclined upper portion of said belt and a collection tank for clean liquid below said inclined upper portion and under said receiving tank;
    inclined belt support means fixed to said side wall means;
    means for feeding a layer of filter media onto said belt so that it can cover the upper surface of its said inclined upper portion;
    sealing means around the periphery of said collection tank for preventing outside air and dirty liquid from said receiving tank from entering said collection tank, said sealing means comprising an elongated sealing member fixed to each said receiving tank side wall and spaced above said inclined belt support means, each said sealing member extending over an edge portion of said belt and having a series of spaced apart longitudinally extending grooves forming a labyrinth, and means for supplying clean liquid to said labyrinth of each said sealing means at a pressure greater than the pressure of dirty liquid within the receiving tank, thereby preventing the migration of dirty liquid around the side edges of said belt;
    suction means for reducing the pressure within and withdrawing clean liquid from said collection tank; and
    drive means for moving said belt forwardly and upwardly along said incline.

2. The filter apparatus as described in claim 1 wherein said rotatable means comprises first and second rollers spaced apart vertically at one end of said frame, a third back roller located between said first and second rollers and inwardly therefrom at said one end; a fourth front roller near the opposite end of said frame from said one end and located higher on said frame than said third roller; and a fifth roller located below said fourth roller and between it and said first roller, all of said rollers being supported by bearing means attached to said frame.

3. The filter apparatus as described in claim 2 wherein said drive means is mechanically connected to said fourth roller for moving said belt.

4. The filter apparatus as described in claim 1 wherein said frame comprises a pair of rear upright members, a pair of front upright members and a pair of inclined members, each of which is attached to a rear upright member and to a front upright member at a higher level and extends upwardly and outwardly from said front members, and front and rear cross members extending between and fixed to said inclined members.

5. The filter apparatus as described in claim 1 wherein receiving tank is comprised of side wall and rear wall members attached to said frame, and said collection tank is comprised of side wall members, a front wall fixed to said front cross member, a rear wall fixed to said rear cross member and a bottom member.

6. The filter apparatus as described in claim 5 wherein said side walls of said receiving tank and said side walls of said collection tank are formed from two integral pieces of sheet metal.

7. The filter apparatus as described in claim 1 including a plurality of transverse spaced apart idler rollers located under said belt and supported at their ends by bearing means fixed to said inclined support members.

8. The filter apparatus as described in claim 1 wherein said means for supplying clean liquid comprises a pair of relatively narrow storage compartments for clean liquid located on opposite sides of the receiving tank and openings in said receiving tank side wall near the bottom of each said compartment for providing clean liquid from the adjacent said narrow compartment to said labyrinth grooves of said sealing member.

9. The filter apparatus as described in claim 8 wherein said sealing means further includes a transverse sealing means fixed to the bottom edge of said end wall means having a labyrinth of grooves on its bottom surface and forming a recess communicating with at least one of said narrow storage compartments, whereby clean liquid at a greater pressure than dirty liquid in the receiving tank flows thereon from said recess through said labyrinth of said transverse sealing means.

10. The filter apparatus as described in claim 9 including an overflow tank for clean liquid on the opposite side of said rear wall from said receiving tank, and means in said overflow tank for removing accumulated clean liquid therein when it reaches a predetermined level.

11. The filter apparatus as described in claim 1 including means forming a drying chamber underneath said conveyor belt at the forward end of said apparatus, and means for producing a flow of air through said drying chamber.

12. The filter apparatus as described in claim 11 including means above said drying chamber for compressing the filter media and accumulated filtrate thereon to remove liquid therein for collection in said chamber, and means for removing collected liquid from said chamber and entrapped air in said liquid.

13. The filter apparatus as described in claim 12 wherein said means for compressing comprises a series of compression rollers spaced apart and rearwardly from said drive roller, each said compression roller being closer to said belt surface, the closer it is to said drive roller.

14. The filter apparatus as described in claim 12 wherein said means for compressing comprises a secondary belt around two spaced apart rollers located about said drying chamber and sloped toward the surface of said conveyor belt and toward said drive roller.

15. The filter apparatus as described in claim 1 wherein said drive means is actuated automatically to advance said conveyor belt at a speed proportional to the pressure in said collection tank which may be adjusted to a predetermined level.

16. The filter apparatus as described in claim 15 wherein said drive means is an air motor controlled by pressurized air through a pressure regulated valve having a control diaphragm connected to a pressure tap from said collection tank.

17. A filter apparatus comprising:
    a frame means;
    a continuous, flexible and pervious belt;

a plurality of rotatable means attached to said frame means for supporting said belt including a back rotatable means located at a relatively low position on said frame means and a front rotatable means located at a relatively high position on said frame means near its opposite end so that said belt has an inclined upper portion that slopes upwardly between said rotatable means;

means including side wall members and a rear wall member attached to said frame forming a receiving tank for dirty liquid above said inclined upper portion of said belt;

means forming a collection tank for clean liquid below said inclined upper portion and under said receiving tank;

means for feeding a layer of filter media onto said belt so that it can cover the upper surface of its said inclined upper portion;

means for supporting said inclined upper belt portion between said receiving tank and said collection tank including fixed belt edge supporting members having upper surfaces for engaging the underside edges of said belt;

means for sealing said collection tank under said belt so that no outside air and no dirty liquid from said receiving tank will enter said collection tank, said means for sealing including a compartment adjacent said receiving tank for retaining clean liquid at a pressure greater than the pressure of dirty liquid at the surface of said belt, and passages for providing flow of clean liquid from said compartment to the side edges of said belt;

suction means for reducing the pressure within and for withdrawing clean liquid from said collection tank;

and drive means for moving said belt forwardly and upwardly from said lower roller means toward said upper roller means.

18. The filter apparatus as described in claim 17 wherein said means for sealing includes sealing members attached to said side walls above said belt edge supporting members, said sealing members having bottom surfaces with a labyrinth of grooves located just above the side edges of said belt.

19. The filter apparatus as described in claim 18 wherein each said sealing member comprises a right angle member fixed by a first leg to a said side wall and having its second leg extending over the edge of said belt, said grooves in the bottom of said second leg being parallel and spaced apart.

20. The filter apparatus as described in claim 18 wherein said means for sealing further includes a rear sealing member fixed to the front bottom edge of said rear wall member and having a labyrinth of grooves located just above said belt.

21. The filter apparatus as described in claim 20 wherein said means for sealing further includes side compartments adjacent both sides of said receiving tank for retaining clean liquid at a pressure greater than the pressure of dirty liquid at the surface of said belt, and passages for providing the flow of clean liquid from said side compartments to said labyrinth of grooves of said sealing members.

22. The filter apparatus as described in claim 20 wherein said frame further includes lower and upper cross members spaced apart and extending between said inclined members and defining the opposite ends of said collection tank.

23. The filter apparatus as described in claim 22 wherein said lower and upper cross members have flat upper surfaces which are co-planar with the upper surfaces of said belt edge supporting members.

24. The filter apparatus as described in claim 23 wherein said belt with said layer of filter media on its upper surface moves under said rear wall member and between said rear sealing member and said lower cross member, and wherein said cross member is wider than said rear sealing member and projects forwardly from it underneath the belt into said collecting tank, thereby blanking out said filter media and preventing direct flow through it for a finite distance, whereby fresh filter media is automatically precoated by lateral flow as it initially enters said receiving tank.

25. The filter apparatus as described in claim 23 including a second rear sealing member on the rear lower edge of said rear wall member.

26. The filter apparatus as described in claim 23 including an apron means attached to and extending rearwardly from said lower cross member in substantially the same plane as its upper surface, said apron having a recess along its forward edge for trapping clean liquid that lubricates said belt as it moves over said lower cross member.

27. The filter apparatus as described in claim 23 including means forming a chamber under said belt between said forwardly, upper cross member and said front roller means, and outlet means on said chamber adapted for connection to a suction device.

28. The filter apparatus as described in claim 17 wherein said drive means is an air motor mechanically coupled to said front roller means and supplied with pressurized air from a regulated source, and wherein the speed of said air motor and thus the rate of rotation of said front rotatable means and the forward movement of said belt is controlled by valve means operable in response to variations in pressure within said collection tank.

29. The filter apparatus as described in claim 17 wherein said drive means is an air motor mechanically coupled to said front roller means and supplied with pressurized air from a regulated source, and including an air line connected to said regulated air source, a pressure controlled valve in said air line, and a pressure tap from said collection tank to said pressure controlled valve, whereby when pressure within said collection tank falls to a preselected level that is preset on said valve, an increased amount of air is supplied to said air motor to increase the rate of belt movement.

30. The filter apparatus as described in claim 17 wherein said suction means is a pump having an inlet connected to an outlet of said collection tank and an outlet connected to an outlet conduit, valve means in said outlet conduit, a feedback branch line connected to said outlet conduit between said pump outlet and said valve means and back to said receiving tank, and means for closing said valve means to force liquid through said feedback branch if pressure in said outlet conduits falls below a preselected level.

31. The filter apparatus as described in claim 30 including a second branch line connected from said feedback branch line through a valve means to said clean liquid compartments.

32. The filter apparatus as described in claim 31 including an air stripping chamber under said belt adjacent to said upper cross member, float means in said air stripping chamber, a third branch line connected to said feedback branch line and through an eductor means which is also connected by an air line to said air stripping chamber, pilot valve means on said eductor responsive to said float means for causing said eductor to remove air through said air line from said air stripping chamber.

33. A filter apparatus comprising:
a frame;
a continuous flexible conveyor belt having a multiplicity of small spaced apart openings;
rotatable means on said frame for supporting said belt so that an inclined upper portion of said belt slopes upwardly between a relatively low back rotatable means and a higher front rotatable means;
means attached to said frame forming a receiving tank for dirty liquid above said inclined upper portion of said belt and a collection tank for clean liquid below said inclined upper portion and under said receiving tank;
means for sealing the periphery of said collection tank adjacent said belt so that no outside air and no dirty liquid from said receiving tank can enter said collection tank including auxililary tank means for receiving clean fluid from said collection tank wherein said clean liquid is retained at a pressure greater than the pressure of dirty liquid at the surface of said belt, and passages for providing a flow of clean liquid from said auxiliary tank means to the periphery of said collection tank;
suction means for reducing the pressure within and withdrawing clean liquid from said collection tank;
drive means for moving said belt forwardly and upwardly along said incline;
whereby filtered out solid material is collected on said belt as it moves through said receiving tank and is removable from said belt as it moves over said front roller.

* * * * *